United States Patent Office 3,579,420
Patented May 18, 1971

3,579,420
SIEVE DEVICE IN AN UPRIGHT CYLINDRICAL CONTAINER FOR CONTINUOUS FLOW OF CELLULOSIC MATERIAL
Johan C. F. C. Richter, St. Jean Cap Ferrat, France, assignor to Aktiebolaget Kamyr, Karlstad, Sweden
Filed Apr. 30, 1968, Ser. No. 725,287
Claims priority, application Sweden, May 5, 1967, 6,340/67
Int. Cl. D21c 7/00
U.S. Cl. 162—237        1 Claim

ABSTRACT OF THE DISCLOSURE

At least one hollow sieve body having coaxial cylindrical sieve faces is located near the lower end of a cylindrical container through which a mixture of cellulosic material and a treating liquid is passed vertically downwards. The sieve body is suspended by a vertical tube located centrally of the container which tube further serves for discharging filtrate from the interior of the sieve body. An operating means at the top of the container periodically lifts the sieve body, which, intermediate of the periodic lifts, moves downwardly with the cellulosic material. The sieve body is given stability by radial support arms which slidably communicate with guide means fixed to the inner side of the container.

---

The invention relates to a sieve device in an upright cylindrical container adapted for continuous axial flow therethrough of cellulosic material mixed with liquid, which sieve device comprises one or more hollow sieve bodies located in the container and having essentially vertical sieve faces for withdrawal from the cellulosic material, of a part of its liquid contents. Such a sieve device is known from the U.S. Pat. No. 3,372,087, and the present invention is directed upon an improvement thereof which is particularly suitable in those cases when the cellulosic material moves in the downward direction through the container and the sieve device is placed in the vicinity of the lower end of the container.

The essential characterizing feature of the invention consists in that the sieve body or bodies are suspended by a tube extending centrally in the container over the greater part of its length and serving for discharging filtrate from the sieve bodies, said tube being connected to an operating means at the top of the container for effecting periodic rapid lifts of the sieve bodies and allowing intermediate drops thereof. Said arrangement involves an improvement in comparison to the embodiment shown in Pat. No. 3,372,087, where the sieve bodies are connected to the operating means by the intermediary of radial supporting arms, the ends of which extend out through the shell of the container, said supporting arms also being used for carrying off the filtrate entering the sieve bodies. Among other things, the invention involves a solution of certain sealing problems in containers with an inner overpressure.

Figure 1:
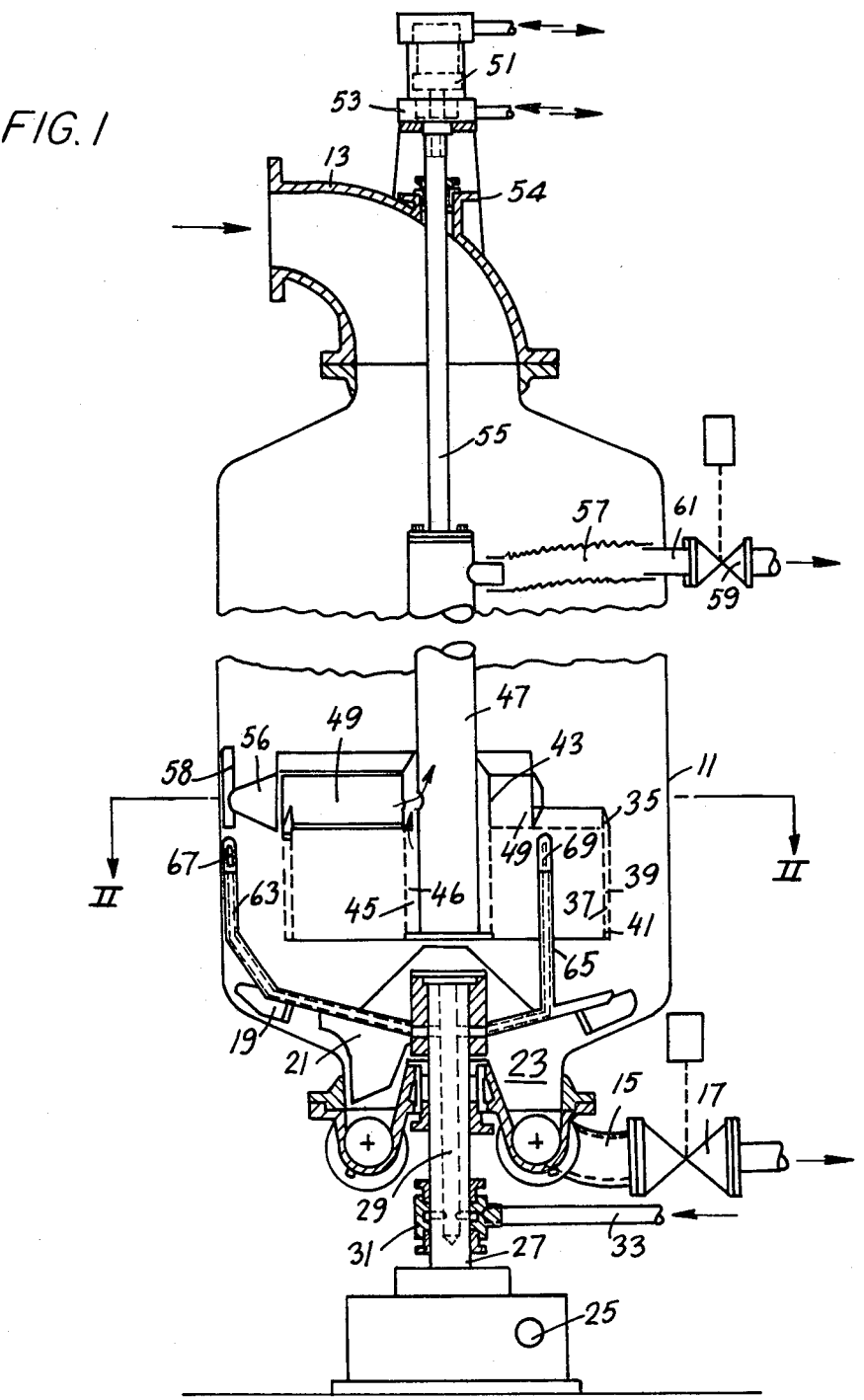
Figure 2:
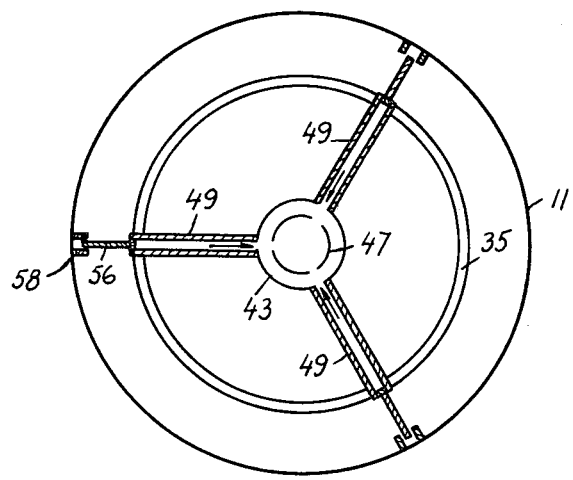

An embodiment of the sieve device according to the invention will be more closely described herein below in reference to the accompanying drawings wherein FIG. 1 is a vertical sectional view of a container equipped with the sieve device in question and FIG. 2 is a sectional view taken on the II—II of FIG. 1.

In the drawing, 11 designates the shell of an upright cylindrical container adapted for fiber liberating digestion of comminuted cellulosic material which, admixed with a suitable digesting liquor, is supplied continuously through a curved neck 13 connected to the top end of the container. At the bottom of the container the digested cellulosic pulp is discharged continuously through a conduit 15 connected to said bottom and having a controllable choking valve 17. A rotary scraper 23 having vanes 19, 21 is attached to a vertical shaft 27 driven by a motor 25 and extending through the bottom of the digester. The shaft 27 has a central bore 29 which is connected via a stuffing box 31 to a conduit 33, through which there is supplied water for performing a preliminary washing as well as cooling and dilution of the cellulosic pulp in connection with its discharge out of the digester.

The sieve device according to the invention, which is used for withdrawing the greater part of the digesting liquor from the digested cellulosic pulp, consists of a set of sieve bodies having cylindrical sieve faces which are coaxial to each other and to the container shell and which have the same axial extension. The drawing shows an outer annular sieve body 35 having two opposite sieve faces 37, 39 and an intermediate cavity 41, and a central sieve body 43 having a single sieve face 45 and a cavity 46 behind the same. Of course, the number of sieve bodies may be increased when required for performing a sieving operation well distributed over the cross-sectional area of the container. The sieve bodies are attached to a vertical tube 47 extending centrally in the container, and are also interconnected, by horizontally and radially extending supporting arms 49. Said supporting arms are hollow and communicate with the cavities 41, 46 of the sieve bodies as well as with the interior of the tube 47. The piston 51 of a hydraulic or pneumatic operating device 53 attached to the neck 13 of the digester, is connected by means of a rod 55 extending through a stuffing box 54, to the upper end of the tube 47, whereby the latter and the sieve bodies attached thereto can be lifted. In order to stabilize the position of the sieve bodies and to guide them in their axial movement the supporting arms are provided with projections 56, which enter each between a pair of parallel, axially directed guiding ribs 58 attached to the inner side of the container shell. The upper end of the tube 47 which is located above the normal level of chips in the digester, is connected by means of a radially extending flexible tube 57 to a stationary conduit 61 extending through the cylindrical shell of the container and having a control valve 59, the digesting liquor screened off by the sieve bodies and driven upwardly through the tube 47 under the action of the overpressure prevailing in the digester being carried off through said conduit. Attached to the rotary scraper 23 are essentially vertically extending spray tubes 63, 65 which are connected to the water supply conduit 33 and which through elongated nozzles 67, 69 at their upper ends distribute liquor over cylindrical faces located approximately at the same level as and suitably positioned relatively to the cylindrical sieve faces for causing a radial and mainly horizontal flow of washing liquid through the cellulosic pulp while displacing the digesting liquor into the sieve bodies. By a suitable adjustment of the valve 59 it is possible to separate the greater part of the digesting liquor from the pulp without causing any significant dilution thereof with washing water. The sieving operation takes place while the sieve bodies are allowed to drop slowly so as to accompany the pulp which is continuously fed towards the outlet, and when the lower limit is reached, the operating device 53 is put into operation in order to comparatively rapidly lift the sieve bodies to their upper end position. During this operation the valve 59 may be closed, so that the pulp is no longer pressed against the sieve faces which would brake their upward motion. When the valve is opened, the screening operation starts again at a higher level. The height of the sieve faces is considerably greater than the extension of their periodic lifts, whereby the screening effect will be essentially uniform.

What is claimed is:

1. Apparatus comprising an upright cylindrical container for continuous axial flow therethrough of cellulosic material mixed with treating liquid, means for feeding said cellulosic material and treating liquid into the top of said container and means for removing said material from the bottom thereof after removal of treating liquid therefrom, an outlet means in said container intermediate the top and bottom thereof for discharging liquid removed from said material, a sieve device comprising at least one hollow sieve body having vertical sieve faces for withdrawal of said liquid from the cellulosic material, said sieve body being suspended by a tube which extends centrally in the container over the greater part of its length and by radially extending support arms, and guide means attached to the inner side of said container which cooperate with said radially extending support arms to allow axial movement of said sieve body, said tube serving for discharging filtrate from the sieve body, a vertical shaft with a diameter smaller than said tube which is fixed to the top of said tube and extends through packing means in the top of said container, and operating means mounted at the top of the container and operatively connected to said shaft to raise and lower said shaft so as to effect periodic rapid lifts of the sieve body and intermediate drops thereof whereby said sieve body may be rapidly raised within said container and then lowered to follow the downward flow of cellulosic material at the rate of said flow and means for placing the contents of the container under pressure whereby treating liquid is forced from said cellulosic material through said sieve body and into said tube and flexible means for passing the liquid from said tube through the outlet means in said container.

References Cited

UNITED STATES PATENTS

| | | | |
|---|---|---|---|
| 2,958,655 | 11/1960 | Brown | 210—388X |
| 3,262,568 | 7/1966 | Zehrbach | 210—388X |
| 3,513,090 | 5/1970 | Migule et al. | 210—388X |
| 3,372,087 | 3/1968 | Richter | 162—251 |

FOREIGN PATENTS

| | | | |
|---|---|---|---|
| 198,496 | 9/1965 | Sweden. | |
| 673,365 | 10/1963 | Canada | 162—251 |

S. LEON BASHORE, Primary Examiner

T. G. SCAVONE, Assistant Examiner

U.S. Cl. X.R.

68—181; 162—251; 210—388